March 27, 1956      A. GODSEY      2,739,407
FISHING LURE
Filed March 21, 1955      2 Sheets-Sheet 1
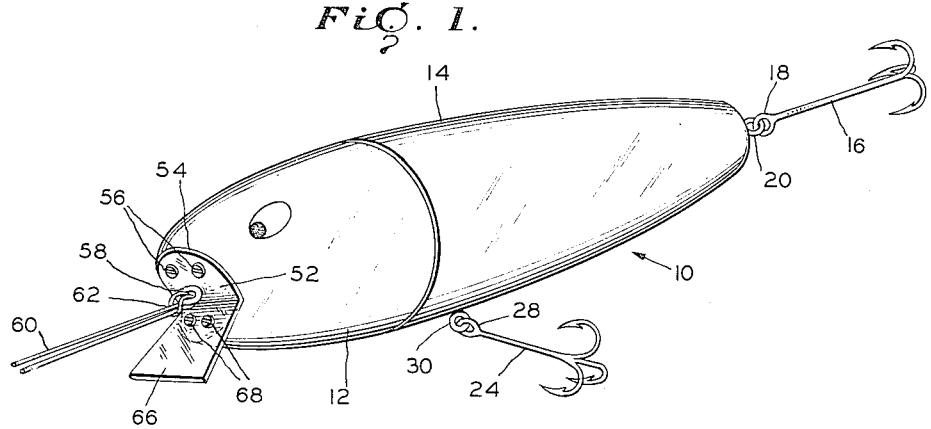
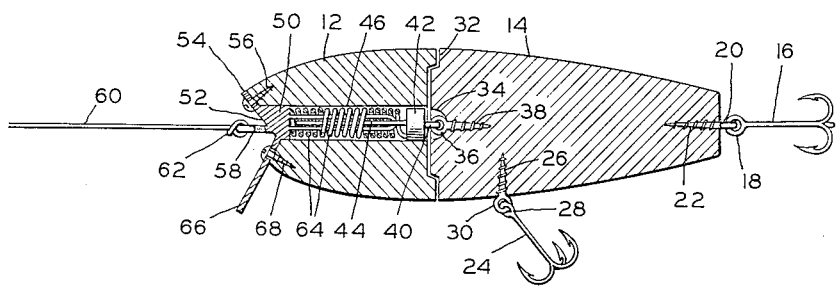
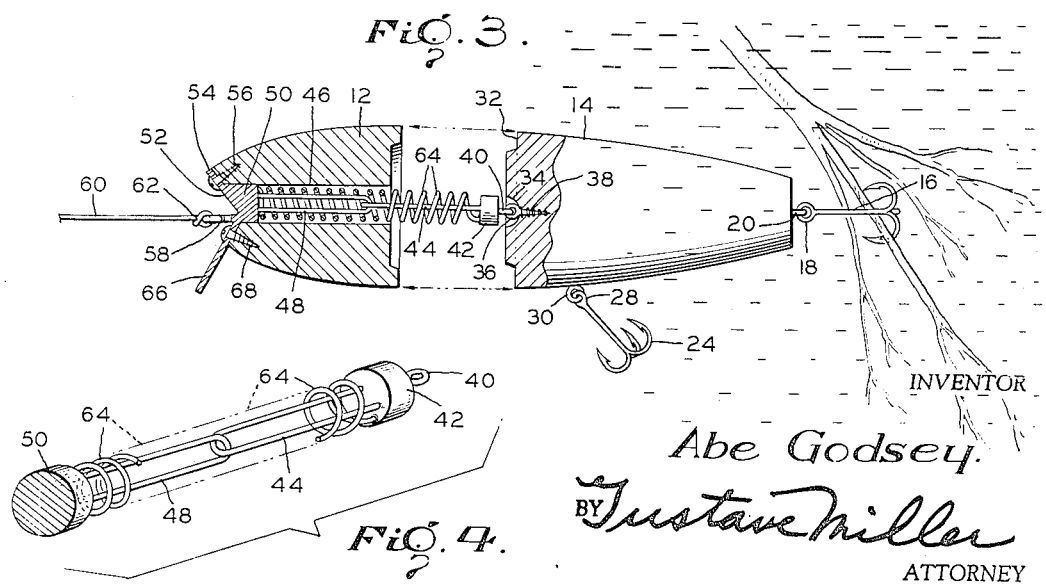
INVENTOR
Abe Godsey.
BY Gustave Miller
ATTORNEY

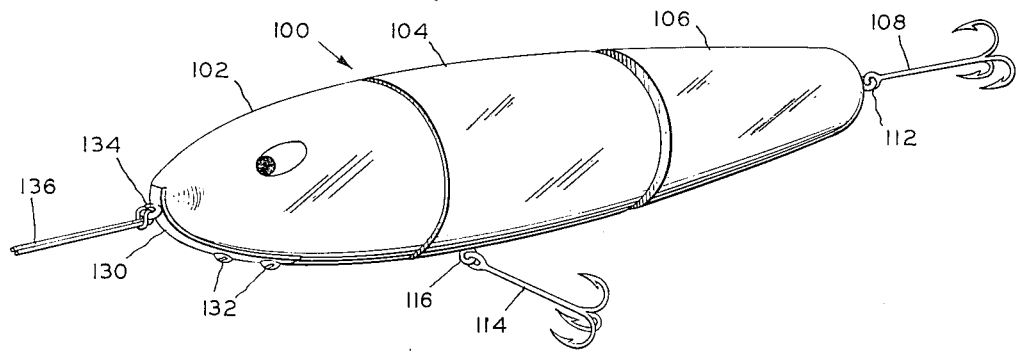
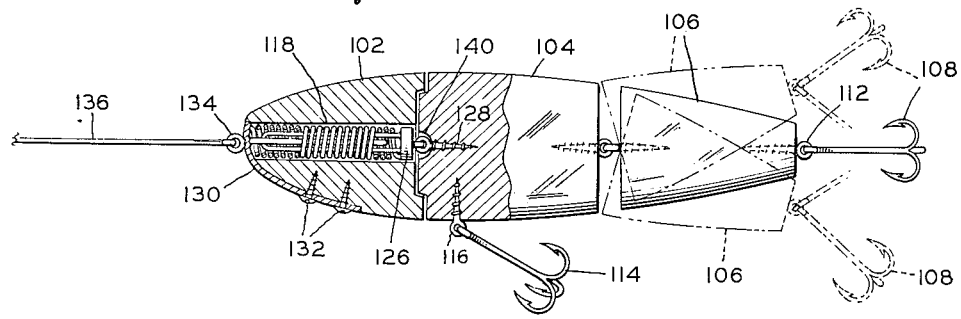
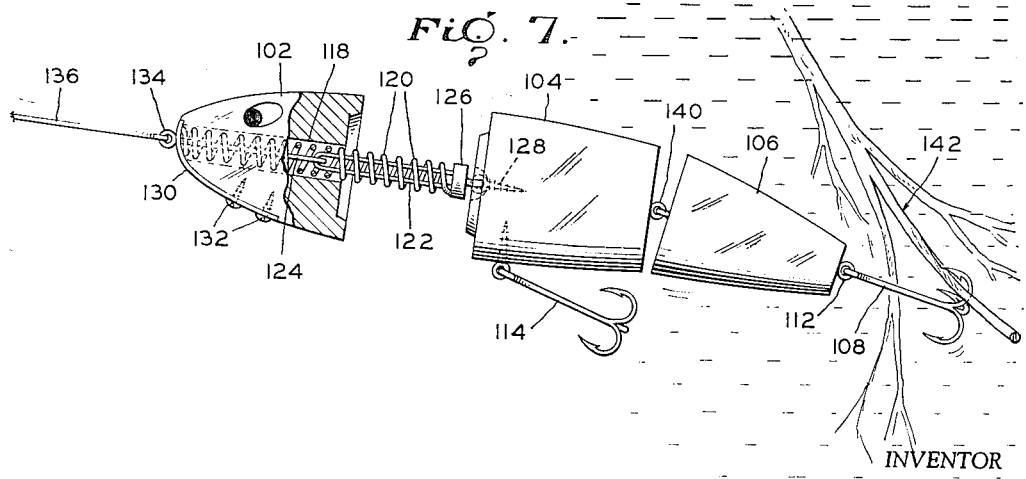

United States Patent Office 2,739,407
Patented Mar. 27, 1956

2,739,407

FISHING LURE

Abe Godsey, Bristol, Tenn.

Application March 21, 1955, Serial No. 495,716

3 Claims. (Cl. 43—42.15)

This invention relates to fish lures used in fishing, and it more particularly relates to fish lures which are provided with one or more fish hooks connected thereto.

There have been many different types of fish lures used before this; however, fish lures of this type often get entangled in roots, twigs or other underwater vegetation. When the prior types of lures were so entangled, it was generally very difficult to disengage them, and it was often necessary to first cut them loose from the line. Another disadvantage of such prior devices lay in the fact that the lure could not generally be used very far under the surface unless made of heavy metal such as lead or unless weighted down with heavy weights. In such case, they would generally sink too far and be difficult to manipulate because of their weight. It is, therefore, one object of the present invention to provide a fish lure with snag releaser which is capable of being easily released from entangling objects by merely manipulating the line.

Another object of the present invention is to provide a fish lure with snag releaser which can be used either at shallow or at relatively deeper depths.

With the above and related objects in view, this invention consists in the details of construction and combination of parts, as will be more fully understood from the following description, when read in conjunction with the accompanying drawings in which:

Fig. 1 is a perspective view of a fish lure with snag releaser embodying the present invention.

Fig. 2 is a central longitudinal cross-sectional view of the device of Fig. 1.

Figure 3 is a side view of the device, partly in section and partly in elevation, showing the lure with snag releaser in expanded condition with the tail portion having a hook entangled in a root.

Fig. 4 is a detail perspective view of the spring and its associated parts, which are used to connect parts of the lure together.

Fig. 5 is a perspective view of a second embodiment of the invention.

Fig. 6 is a side view, with portions broken away, of the device of Fig. 5.

Fig. 7 is a view, somewhat similar to Fig. 6, but showing the lure in expanded condition, with the hook of the tail portion shown entangled in a root.

Referring in greater detail to the drawings wherein similar reference characters refer to similar parts, there is shown a lure with snag releaser, generally designated 10, comprising a head portion 12 of substantial mass and a tail portion 14. The lure is shown as formed in the general lines of a fish. A multi-barbed fish hook 16 extends rearwardly of the lure and is connected directly to the lure by an eyelet 18 connected to a ring 20. The ring 20 is provided with a screw-threaded portion 22 which is screwed into the lure. The eyelet and ring connection permits free play of the hook 16 in relation to the lure. This is important since it permits a swivel action which aids in disentangling the hook from an obstruction. A second multi-barbed hook 24 is connected to the underside of the lure by a screw-threaded portion 26 similar to screw 22; the connection between the hook 24 and screw 26 also being an eyelet and ring connection as at 28 and 30.

The tail section 14 is provided with a peripheral recess 32 in its front face. In the center of this front face is a central recess 34. Positioned within this central recess is a ring 36 having a screw-threaded portion 38 which is screwed into the front face of the tail portion. Connected to this ring 36, as by eyelet 40, is a disc or spring follower 42. Extending from the opposite face of the disc 42 is a U-shaped rod or link 44, the legs of which are connected to the disc in any desired manner. This rod 44 with the spring follower 42 is adapted to extend into a central bore 46 in the head portion 12 where the rod is telescopically engaged with a similar U-shaped rod or link 48, as best seen in Fig. 4. The rod 48 has its free ends connected to a plug 50 at the front end of the bore, this plug 50 having a face plate 52 provided with a flange portion 54 extending upwardly at an inclined angle. The flange 54 is provided with holes to receive screws 56 which fasten the plug in the lure. The inclined angle of the face plate is used to simulate the mouth of the fish-shaped lure. A ring 58 extends from the plug and is used as a fastening means for the line 60 which is connected to it by means of an eyelet 62. Surrounding the rods 44 and 48, within the bore 46, is a coil spring 64. This spring 64 is connected at one end to the disc or spring follower 42, and, at the other end, to the plug 50. The spring 64 normally acts to bias the tail section 14 against the head section 12 so that the spring and the rods 44 and 48 and spring follower 42 are situated entirely within the bore 46 in the manner shown in Figs. 1 and 2.

Integral with the face plate 52 is an outwardly and downwardly inclined plate 66 connected to the lure by screws 68. This plate 66 acts as a baffle member to disturb the streamline of the lure and create a vortex effect as the lure moves through the water. This results in a sinking of the lure to lower depths in a manner similar to the action of an airfoil in an airplane. If it is desired to maintain the lure at or close to the surface, the plate 52 is replaced by a plate which lacks a baffle plate 66. It is also possible to make the portion 66 of the plate 52 separate therefrom. In such case, the separate plate 66 could merely be removed by removing the screws 68.

As was stated above, the front and rear sections 12 and 14 are generally maintained close together, in the manner shown in Figs. 1 and 2, by the spring 64. However, when one of the hooks is entangled in a root or vine, such as indicated in Fig. 3, the hook can usually be disengaged therefrom by exerting a tug on the line 60. This causes the two sections to be pulled apart against the tension of the spring 64. The line is then suddenly released, causing the spring to snap back and cause the two sections to collide. The impact of the head section of substantial mass against the tail section causes the hook to be jarred free from the entanglement.

In Figs. 5 to 7, there is illustrated a second embodiment of the invention. In this embodiment, the lure 100 is generally similar to the lure 10 except that it comprises three sections instead of two. These three sections comprise a head section 102 of substantial mass, a center section 104, and a tail section 106. A rear multi-barbed hook 108 is connected to the tail section by a ring and eyelet, generally indicated at 112, and which is similar to the structure shown in Figs. 1 to 4. A multi-barbed hook 114 is connected to the center section 104 by a ring and eyelet connection, generally indicated at 116.

A bore 118, similar to bore 46, is provided in head section 102 and is adapted to hold a coil spring 120, similar to spring 64. A pair of U-shaped rods or links 122 and 124, similar to rods 44 and 48, act to limit the extension of the spring 120. The rod 122 is connected to a disc or spring follower 126 attached to the center section 104 by a screw 128. One end of the spring 120 is also connected to the disc or spring follower 126. The opposite end of the spring, as well as the free ends of the rod 124, are connected to a plate 130 which is curved in conformity to the shape of the nose portion of the lure. This plate 130 is connected to the lure by screws 132. A ring 134 extends forwardly from the plate 130 and is adapted to be connected to a line 136.

The center section 104 and the tail section 106 are connected together in hinged relation by a ring and eyelet connection such as indicated at 140.

As can be seen from Fig. 7, when a hook is caught in a twig or other entanglement, such as indicated at 142, the line 136 is pulled back to draw head section 102 away from the center section 104, and is then released. This causes the head section to snap back with an impact against the center section 104. The force of this impact is transmitted angularly through connection 140 to the tail section 106. The compound action, including the angularly directed force between center section 104 and tail section 106, acts not only to jar the hook against the twig but forces it angularly away therefrom. This compound action is even more effective in releasing the hook from the twig than is the simple jarring action provided by the construction of Figs. 1 to 4.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fish lure with snag releaser comprising an elongated body having a plurality of axially aligned sections including a head section of substantial mass, said head section having a bore extending axially therethrough, a closure at the front end of said bore, a spring connected at one end to said closure and extending through said bore, a spring follower connected to the opposite end of said spring and being attached to the adjacent section of said body, said spring follower extending into said bore when the spring is in its normally contracted position, and a pair of interlocking rods, one of which is connected to said closure and the other of which is connected to said spring follower, said rods being constructed to telescope together when said spring is in its normally contracted position, and to extend axially from the telescoped position to positions limited by the interlocking engagement thereof when said spring is in its extended position, and a hook pivoted directly to said adjacent section.

2. The fish lure of claim 1 wherein said closure is a plug in the front end of said bore and a baffle member extending laterally from the plug.

3. The fish lure of claim 1 wherein said closure is a plate on the outer surface of said head section and conforming to the general contour of said surface.

References Cited in the file of this patent

UNITED STATES PATENTS

| 1,241,707 | Capooch | Oct. 2, 1917 |
| 1,359,618 | Oliver et al. | Nov. 23, 1920 |
| 1,842,591 | Dunkelberger | Jan. 26, 1932 |
| 1,941,370 | Vann | Dec. 26, 1933 |
| 2,079,335 | Pflueger | May 4, 1937 |
| 2,153,489 | Whitis | Apr. 4, 1939 |
| 2,482,309 | Wilson | Sept. 20, 1949 |
| 2,616,203 | Sarakas | Nov. 4, 1952 |

FOREIGN PATENTS

| 986,156 | France | Mar. 21, 1951 |